(12) United States Patent
Keech et al.

(10) Patent No.: US 6,284,445 B1
(45) Date of Patent: Sep. 4, 2001

(54) REFERENCE CALIBRATION PATCH ARRANGEMENT TO MINIMIZE EXPOSURE AND MEASUREMENT ARTIFACTS AND MAXIMIZE ROBUSTNESS TO DEFECTS

(75) Inventors: John T. Keech, Penfield; Donald O. Bigelow, Webster; Nathan D. Cahill, Rochester; Thomas F. Powers; John P. Spence, both of Webster, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/635,257

(22) Filed: Aug. 9, 2000

(51) Int. Cl.$^7$ .................................................. G03C 1/00
(52) U.S. Cl. ........................................ 430/495.1; 430/359
(58) Field of Search ........................................... 430/495.1

(56) References Cited

U.S. PATENT DOCUMENTS

| | | | |
|---|---|---|---|
| 3,718,074 | 2/1973 | Davis | 396/315 |
| 4,211,558 | 7/1980 | Oguchi et al. | 430/359 |
| 4,260,245 | 4/1981 | Hujer | 355/40 |
| 4,365,882 | 12/1982 | Disbrow | 354/106 |
| 4,464,045 | 8/1984 | Findeis et al. | 355/38 |
| 4,577,961 | 3/1986 | Terashita | 355/77 |
| 4,634,850 | 1/1987 | Pierce et al. | 235/487 |
| 4,786,792 | 11/1988 | Pierce et al. | 235/456 |
| 4,874,936 | 10/1989 | Chandler et al. | 235/494 |
| 4,881,095 | 11/1989 | Shidara | 354/298 |
| 4,884,102 | 11/1989 | Terashita | 355/77 |

(List continued on next page.)

FOREIGN PATENT DOCUMENTS

0762201A1   3/1997   (EP) .
0926550A1   6/1999   (EP) .
11-316448   11/1999   (JP) .

OTHER PUBLICATIONS

U.S. Provisional Ser. No. 60/211,058 filed Jun. 3, 2000 by Levy et al.
U.S. Provisional Ser. No. 60/211,446 filed Jun. 3, 2000 by Irving et al.
U.S. Provisional Ser. No. 60/211,065 filed Jun. 3, 2000 by Irving et al.
U.S. Provisional Ser. No. 60/211,079 filed Jun. 3, 2000 by Irving et al.
U.S. application No. 09/635,389, Klees et al., filed Aug. 9, 2000.
U.S. application No. 09/635,178, Cahill et al., filed Aug. 9, 2000.
U.S. application No. 09/635,496, Keech et al., filed Aug. 9, 2000.
U.S. application No. 09/635,179, Keech et al., filed Aug. 9, 2000.
U.S. application No. 09/636,058, Keech et al., filed Aug. 9, 2000.
U.S. application No. 09/635,600, Keech et al., filed Aug. 9, 2000.

*Primary Examiner*—Hoa Van Le
(74) *Attorney, Agent, or Firm*—Thomas H. Close

(57) ABSTRACT

Reference calibration patches produced by a sequence of exposures on a photographic element, the photographic element exhibiting linear defects in a predominant direction, are arranged in a two dimensional array and exposures are assigned to the reference calibration patches in the array such that nearest neighbors in the predominant direction are not nearest neighbors in the exposure sequence, whereby the effects of a linear defect are reduced; and the maximum number of steps in the exposure sequence between a reference calibration patch and that of its nearest neighbors in any direction is less than a predetermined number, whereby the effects of flare are reduced.

17 Claims, 3 Drawing Sheets

U.S. PATENT DOCUMENTS

| | | | |
|---|---|---|---|
| 4,939,354 | 7/1990 | Priddy et al. | 235/456 |
| 5,075,716 | 12/1991 | Jehan et al. | 355/1 |
| 5,189,521 | 2/1993 | Ohtsubo et al. | 358/296 |
| 5,198,907 | 3/1993 | Walker et al. | 358/296 |
| 5,267,030 | 11/1993 | Giorgianni et al. | 358/527 |
| 5,452,055 | 9/1995 | Smart | 355/68 |
| 5,519,510 | 5/1996 | Edgar | 358/471 |
| 5,591,956 | 1/1997 | Longacre, Jr. et al. | 235/494 |
| 5,649,260 | 7/1997 | Wheeler et al. | 396/569 |
| 5,667,944 | 9/1997 | Reem et al. | 430/359 |
| 5,698,382 | 12/1997 | Nakahanada et al. | 430/418 |
| 5,736,996 | 4/1998 | Takada et al. | 347/19 |
| 5,758,223 | 5/1998 | Kobayashi et al. | 396/604 |
| 5,767,983 | 6/1998 | Terashita | 358/302 |
| 5,832,328 | 11/1998 | Ueda | 396/572 |
| 5,988,896 | 11/1999 | Edgar | 396/604 |

REFERENCE CALIBRATION PATCH ARRANGEMENT TO MINIMIZE EXPOSURE AND MEASUREMENT ARTIFACTS AND MAXIMIZE ROBUSTNESS TO DEFECTS

FIELD OF THE INVENTION

The present invention relates to photography and more particularly to the arrangement of reference calibration patches on photographic elements for use in photofinishing.

BACKGROUND OF THE INVENTION

The use of a sequence of reference calibration patches exposed on a roll of film to enable better exposure control during optical printing is known in the art; see for example U.S. Pat. No. 5,767,983 issued Jun. 16, 1998 to Terashita entitled Color Copying Apparatus for Determining Exposure Amount from Image Data of an Original Image and a Reference Image. The use of reference calibration patches has also been shown to be useful in determining correction values for scanned film data used in digital printing. See for example U.S. Pat. No. 5,667,944 issued Sep. 16, 1997 to Reem et al. entitled Digital Process Sensitivity Correction, and U.S. Pat. No. 5,649,260 issued Jul. 15, 1997 to Wheeler et al. entitled Automated Photofinishing Apparatus.

Problems experienced with these reference calibration patches have included the occurrence of naturally arising artifacts in exposing the reference calibration patches onto the film, difficulties experienced in subsequent measurement of the patches on processed film, and data loss due to defects such as scratches or streaks in the images of the printed patches. To limit the area of film that is occupied by the reference calibration patches, it is desirable to expose as many reference calibration patches as possible onto the smallest area of film. In the exposure process, flare from high exposure reference calibration patches can affect the exposure of nearby patches, thereby affecting the intended exposure of the nearby patches. In the measurement process, flare can bias the accurate reading of the patch density, particularly in high density patches.

There is a need therefore for an improved reference calibration patch arrangement that minimizes the problems noted above.

SUMMARY OF THE INVENTION

The need is met according to the present invention by providing an arrangement of reference calibration patches produced by a sequence of exposures on a photographic element, the photographic element exhibiting linear defects in a predominant direction, that are arranged in a two dimensional array and exposures are assigned to the reference calibration patches in the array such that nearest neighbors in the predominant direction are not nearest neighbors in the exposure sequence, whereby the effects of a linear defect are reduced; and the maximum number of steps in the exposure sequence between a reference calibration patch and that of its nearest neighbors in any direction is less than a predetermined number, whereby the effects of flare are reduced.

ADVANTAGES

The reference calibration patch arrangement of the present invention has the advantages that the impact of exposure flare in exposing the patches, the impact of flare in a scanner used to read the patches, and the effect of loss of data to extended linear defects is reduced, while minimizing the rectangular area occupied by the reference calibration patch arrangement on the photographic element.

DETAILED DESCRIPTION OF THE INVENTION

Figure 1:
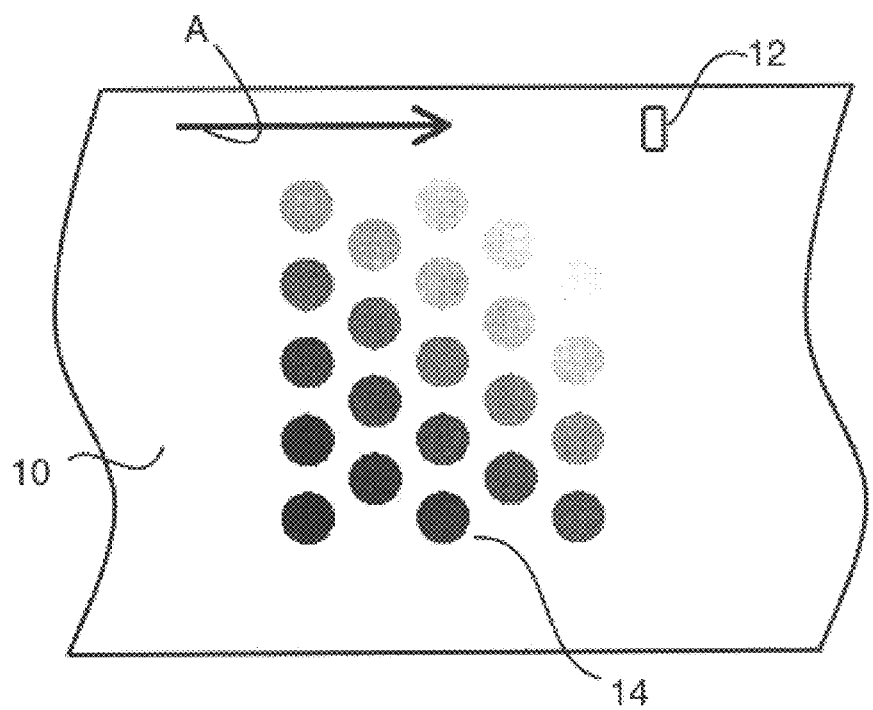
FIG. 1 is a schematic diagram of a film strip having a reference calibration patch arrangement according to the present invention.

We have found that it is difficult to determine correction values for calibrating film data using measurements of a sequence of reference calibration patches exposed onto the roll of film, unless the arrangement of these patches is made in a specific manner to minimize artifacts during both exposure and measurement. Additionally, we have found that the sequence of reference calibration patches can be arranged to efficiently use space on the film. The arrangement of the reference calibration patches according to the present invention also enables greater robustness of the resulting reference calibration to data loss induced by the presence of extended linear defects, such as streaks, scratches, etc. The sequence of reference calibration patches used in this invention could be a plurality of neutral patches, colored patches, or any combination thereof.

When placing a sequence of reference calibration patches on a photographic element, problems may arise in an exposure step, in a measurement step, or in a design choice which will determine a preferred arrangement and exposure assignment. A photographic element includes at least a base with a photosensitive layer that is sensitive to light to produce a developable latent image. The photosensitive layer may contain conventional silver halide chemistry, or other photosensitive materials such as thermal or pressure developable chemistries. It can have a transparent base, a reflective base, or a base with a magnetically sensitive coating. The photographic element can be processed through standard chemical processes, including but not limited to Kodak Processes C-41 and its variants, ECN-2, VNF-1, ECP-2 and its variants, D-96, D-97, E-4, E-6, K-14, R-3, and RA-2SM, or RA-4; Fuji Processes CN-16 and its variants, CR-6, CP-43FA, CP-47L, CP-48S, RP-305, RA-4RT; Agfa MSC 100/101/200 Film and Paper Processes, Agfacolor Processes 70, 71, 72 and 94, Agfachrome Processes 44NP and 63; and Konica Processes CNK-4, CPK-2-22, DP, and CRK-2, and Konica ECOJET HQA-N, HQA-F, and HQA-P Processes. The photographic element can be processed using alternate processes such as apparently dry processes that may retain some or all of the developed silver or silver halide in the element or that may include lamination and an appropriate amount of water added to swell the photographic element. Depending upon the design of the photographic element, the photographic element can also be processed using dry processes that may include thermal or high pressure treatment. The processing may also include a combination of apparently dry, dry, and traditional wet processes. Examples of suitable alternate and dry processes include the processes disclosed in: U.S. Ser. No. 60/211,058 filed Jun. 3, 2000 by Levy et al.; Ser. No. 60/211,446 filed Jun. 3, 2000 by Irving et al.; Ser. No. 60/211,065 filed Jun. 3, 2000 by Irving et al.; Ser. No. 60/211,079 filed Jun. 3, 2000 by Irving et al.; EP Pat. No. 0762201A1 published Mar. 12, 1997, by Ishikawa et al., entitled Method of Forming Images; EP Pat. No. 0926550A1, published Dec. 12, 1998, by Iwai, et al., entitled Image Information Recording Method; U.S. Pat. No. 5,832,328 issued Nov. 3, 1998 to Ueda, entitled Automatic Processing Machine for a Silver Halide Photographic Light-sensitive Material; U.S. Pat. No. 5,758,223 issued May 26, 1998 to Kobayashi, et al., entitled Automatic Processing Machine for Silver Halide Photographic Light-sensitive Material; U.S. Pat. No. 5,698,382 issued Dec. 16, 1997 to Nakahanada, et al., entitled Processing Method for Silver Halide Photographic Light-sensitive Material; U.S. Pat. No. 5,519,510 issued May 21, 1996 to Edgar, entitled Electronic Film Development; and U.S. Pat. No. 5,988,896 issued Nov. 23, 1999 to Edgar, entitled Method and Apparatus for Electronic Film Development.

Figure 5:
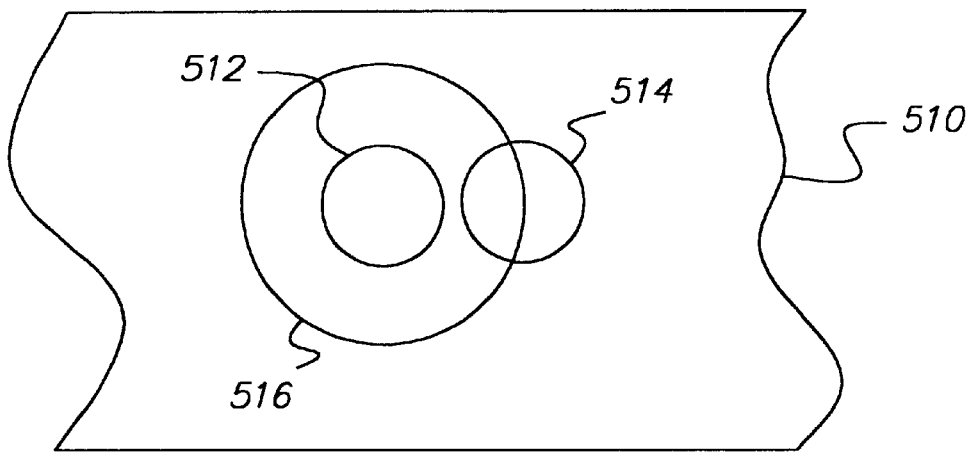
FIG. 5 is a diagram useful in describing the problems of exposure and measurement flare.
Figure 6:
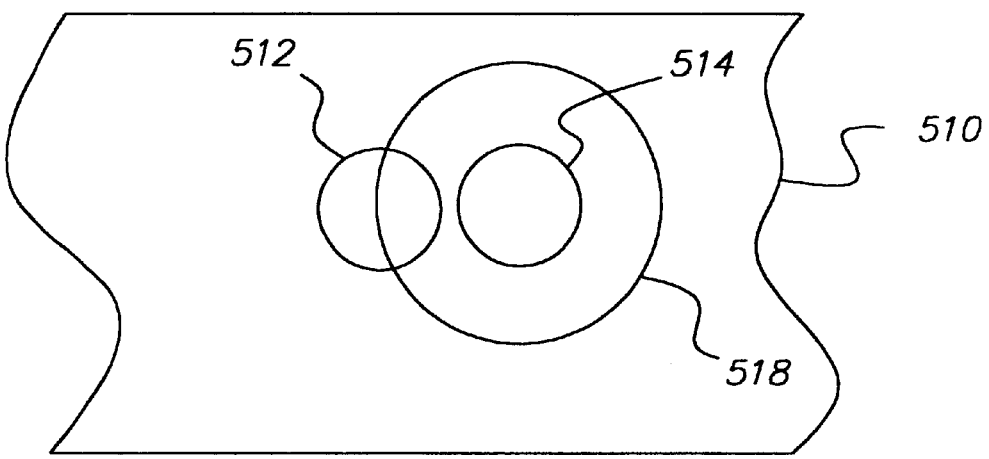
FIG. 6 is a diagram useful in describing the problems of exposure and measurement flare.

Referring to FIG. 5, in the exposure step, when two reference calibration patches 512 and 514 are exposed onto photographic element 510, light intended to expose patch 512 can impinge upon a larger area 516 overlapping the area intended for patch 514. Several mechanisms, including flare and light scattering, can cause the exposure to impinge on the larger area 516. Conversely, referring to FIG. 6, light intended to expose patch 514 can similarly impinge upon a larger area 518 overlapping the area intended for patch 512. An example of various pairs of desired exposures designated for patches 512 and 514 is shown in columns 1 and 2 of Table 1 below. In this example, exposure of patch 512 results in flare throughout the surrounding area 516 which is assumed to be at a level of 1% of the exposure intended for patch 512. Thus, an incremental exposure is given to patch 514 where area 516 overlaps it. Similarly, exposure of patch 514 results in flare throughout the surrounding area 518 which is assumed to be at a level of 1% of the exposure intended for patch 514. Thus, an incremental exposure is also given to patch 512 where area 518 overlaps it. As a result of such exposure cross-contamination, portions of the patches would actually receive the exposure shown in columns 3 and 4 of Table 1. The resulting log exposure errors are shown in columns 5 and 6.

TABLE 1

| Example | Desired Exp. 512 | Desired Exp. 514 | Actual Exp. 512 | Actual Exp. 514 | Log Exp. error 512 | Log Exp. error 514 |
|---|---|---|---|---|---|---|
| 1 | 1000 | 1 | 1000.01 | 11 | 4.3E-6 | 1.041 |
| 2 | 1000 | 10 | 1000.1 | 20 | 4.3E-5 | 0.301 |
| 3 | 1000 | 100 | 1001 | 110 | 4.3E-4 | 0.041 |
| 4 | 1000 | 500 | 1005 | 510 | 2.2E-3 | 0.009 |
| 5 | 2 | 1 | 2.01 | 1.02 | 2.2E-3 | 0.009 |

These examples show that in all cases, the error in log exposure is smaller in patch 512, designated to receive a higher level of exposure, than that in patch 514, designated to receive a lower level of exposure. Further, the relative errors depend only on the ratio of the levels, as seen in the fourth and fifth row of the table. In addition, the closer the ratio of exposures is to one, the lower the log exposure errors become, as seen in the first four rows of the table wherein the absolute amount of contamination from patch 512 remains constant at 10 units.

The response of a photographic element, such as a color negative film, is typically linear in log exposure over a wide range of exposures. In such a case, the effect of cross-contamination of reference calibration patches having different exposures in proximity to each other is clearly lessened if the exposure levels of nearby patches are nearby in exposure ratio or equivalent in log exposure.

In typical applications, the intensity of stray light, due to such mechanisms as optical flare from an illumination system or in-film light scattering, falls off continuously with distance. For a given acceptable ratio of inadvertent to desired exposure, the closer two patches are in their desired illumination level, the more closely the patches may be placed before unacceptable exposure occurs at all and the smaller any zone within a patch of unacceptable contamination will be. Conversely, the closer two patches are in their desired illumination level at a given patch spacing, the lower the ratio of inadvertent to desired exposure at any point becomes. Reference calibration patches created in a system with significant stray light can be used so long as they are sufficiently large or widely enough separated to accommodate subsequent measurement in a portion that has an acceptable level of inadvertent exposure from other, typically only neighboring, patches. Thus assignments of exposures which tend to place patches with similar exposures near each other will result in more compact arrangements or larger useful zones for measurement.

Referring again to FIG. 6, when reference calibration patches 512 and 514 placed on a photographic element 510 such as a negative working film, are measured using a device such as a film scanner, the dominant effect of the cross-contamination is reversed. In a typical scanner, a linear or area array of sensors is used to simultaneously view an illuminated narrow band or large area of the film, respectively. In the event that multiple patches or portions thereof are simultaneously illuminated and viewed by the sensor array, stray light from one patch can inadvertently affect the measured density in the sensors designated to view another patch. In this case, the dominant effect is from light transmitted through a lower density patch 514 (resulting from development of a patch receiving a lower exposure), causing inadvertent additional illumination of sensors intended to receive radiation in an area 518, some of which are intended to be measuring a higher density patch 512 (resulting from development of a patch receiving a higher exposure).

For a given acceptable ratio of inadvertent to desired sensor illumination, again, this effect falls off with distance in typical applications, so proximity again should be correlated, this time with density level. For a given acceptable ratio of inadvertent to desired sensor illumination, the closer two adjacent patches are in their desired density level, the narrower the physical zone in which unacceptable sensor illumination occurs.

For negative working photographic elements, it has been found that measurement error due to stray light is increased if the higher exposure (and hence density) reference calibration patches are separated from each other to such an extent that there is negligible exposure between the flare regions 516 surrounding each patch. In such a case, the negligible density regions between patches can strongly affect measurements within a given patch. Hence it is desirable in negative working photographic materials that the reference calibration patches be located closely enough so that the flare regions 516 overlap.

If a patch is large enough so that the limited range of these sources of contamination does not affect data taken near the center of a patch and the central area is sufficiently large to provide adequate data for statistical treatments, accurate measurements may still be obtained. Thus, it is preferable that the patches be larger and closer together rather than smaller and more widely separated.

A typical prior art step tablet arrangement, with a sequence of rectangular patches juxtaposed in a linear arrangement, accomplishes the goals of reducing the effects of exposure and measurement errors by placing exposures in a monotonically increasing sequence from the lowest exposure at one end to the highest exposure at the other. This arrangement is optimal from exposure and measurement standpoints in that the exposure and measurement effects are made as small as practicable for a given set of desired exposures and densities by minimizing the exposure ratios and density differences between the steps. When the extent of contamination effects in exposure and measurement is factored in, a portion of each step edge will be outside an acceptable range for measurement error. Additionally, the presence of measurement noise and random nonuniformity in density requires that a number of measurements be averaged. Elimination of unacceptable data and use of multiple data points for averaging implies a minimum size requirement for a step. The problem with the traditional step tablet arrangement is that given the minimum size for each step, the tablet becomes too long to conveniently fit on a conventional film strip. Reference calibration patch arrangements that are arranged in two dimensional arrays are more efficient in using the space on a film strip, but such arrays admit a possibility of having adjacent patches that are undesirably far apart in the exposure sequence. For example, if a long sequence of patches is desired but fewer patches can be fit into a desired length, the sequence of patches can be rearranged into a two dimensional array comprising a collection of linear subarrays, with each subarray comprising a segment of the sequence. This may be accomplished in a variety of ways. One way is to use a small number of longer segments. However, such an arrangement can place patches adjacent to each other that are widely separated in the sequence. This could lead to a need for a greater spacing between the linear subarrays than within a linear subarray to avoid exposure or measurement flare artifacts, which would in turn increase the area needed on the photographic element. Another way is to use a larger number of shorter segments. This reduces the number of steps between neighboring patches in the array and allows for a lesser spacing between the linear subarrays.

Additionally, by offsetting the linear subarrays by half the center-to-center distance within each subarray, the subarrays can be placed such that the patches form a hexagonal close packed array, with equal center-to-center distance between all nearest neighbor patches. This achieves a closer packing than a rectangular array, and improves the overlap between the flare regions around each patch that is useful in reducing scanning flare effects.

In film systems, the dominant direction of extended defects such as streaks and scratches tends to be along the length of a film strip. Such a defect could corrupt the data from multiple patches aligned with the length of the strip. Ability to detect, eliminate, and replace defective data in the generation of reference calibration tables can be enhanced by arranging patches so that a single linear defect cannot corrupt the data from a subset of patches that form a contiguous segment of the exposure sequence. Additionally, arrangements that reduce the number of patches aligned with the length of the strip would lead to less data loss from such a linear defect. The optimal solution from the standpoint of minimizing the effects of linear defects alone would be to have one patch in each row, that is, to have the patches aligned in a linear array across the film strip. However, in a film strip, the widthwise dimension is shorter than the lengthwise direction, so this solution is impractical.

The use of arrangements having patches placed so that the offset linear subarrays are aligned perpendicular to the length of the strip, reduces the number of patches that would be affected by a single longitudinal defect relative to a parallel alignment or rectangular array. In a close-packed arrangement, if the area to be measured is less than 86.6% of the inter-spot spacing, any such defect would affect a patch in at most every other subarray of patches.

Referring to FIG. 1, a photographic element 10, for example, a strip of color negative film with a perforation 12 is exposed with a two-dimensional array of reference calibration patches 14 representing a sequence of exposures. The photographic element 10 exhibits linear defects, such as film scratches, in a predominant direction indicated by arrow A. This array of reference calibration patches is advantageously placed in an area of the film strip relative to the perforation analogously to placement of an ordinary image frame, as disclosed in co-pending patent application U.S. Ser. No. 09/635,496, entitled Photographic Element With Reference Calibration Data. The arrangement of these reference calibration patches, including specific locations of the patches within the array and assignment of exposures to these locations is the subject of the present invention.

Figure 2:
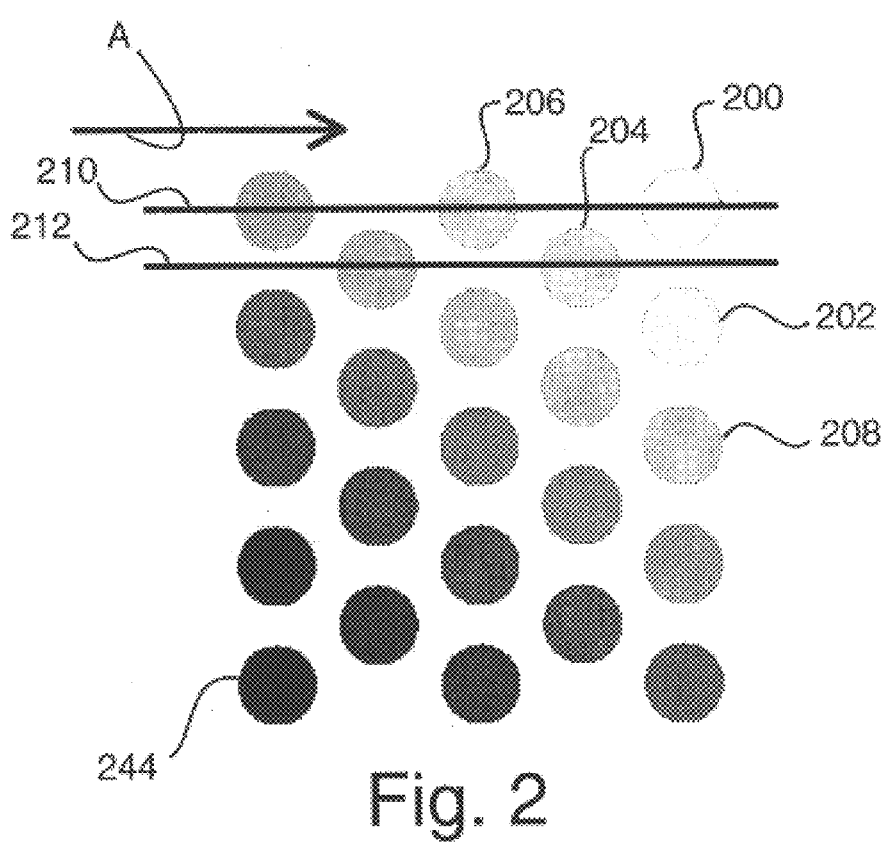
FIG. 2 is a schematic diagram of a reference calibration patch arrangement according to the present invention.

Referring to FIG. 2, an arrangement of 23 circular reference calibration patches is shown. Although circular patches are shown, other patch shapes, such as square, rectangular, and hexagonal can be employed. The patches are arranged on centers that form vertical columns with vertical offsets between each column to effect more efficient packing. The exposure sequence increases along diagonal paths starting with a first (or zero) exposure patch 200, followed by the next steps in the exposure sequence in order in the next diagonal group of patches 202, 204, and 206, followed by the next patch 208 at the start of the next diagonal group, and proceeding in likewise fashion up to the highest step 244 in the exposure sequence. As seen from FIG. 2, a single linear defect 210 parallel to arrow A in the top row of patches will affect the reference calibration patches corresponding to the first, fourth and ninth steps in the sequence. A linear defect 212 in the second row will affect reference calibration patches corresponding to the third and eighth steps. Thus, the exposures of reference calibration patches affected by a single linear defect are separated by more than one step in the exposure sequence.

Figure 3:
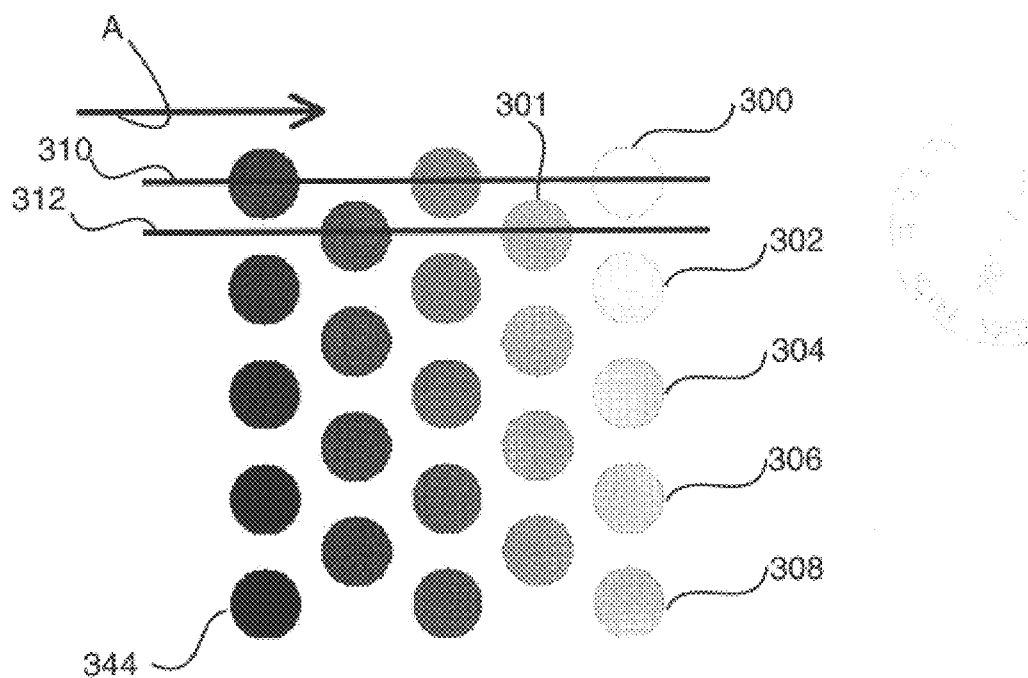
FIG. 3 is a schematic diagram of an alternative arrangement of reference calibration patches according to the present invention.

Referring to FIG. 3, the same two dimensional arrangement of reference calibration patches may have a different assignment of steps in the exposure sequence to the patches that further separates the patches in the sequence affected by a linear defect at the expense of having adjacent patches separated by a greater number of steps in parts of the array. In this example, the steps progress along vertical columns starting with a lowest exposure patch 300, followed by increasing exposures in the column 302, 304, 306, and 308, followed by the next exposure in patch 301 at the start of the next vertical column, and proceeding in likewise fashion up to the highest exposure patch 344. A single linear defect 310 parallel to arrow A in the top row of patches will affect the reference calibration patches corresponding to the first, tenth, and nineteenth steps of the sequence. A linear defect 312 in the second row will affect the reference calibration patches corresponding to the sixth and fifteenth steps. Thus, the reference calibration patches affected by a single linear defect are more widely separated in the exposure sequence in this arrangement, however, some of the differences in steps in the exposure sequence of adjacent patches are also increased. For example neighboring patches 300 and 301 in FIG. 3 are separated by 5 steps, whereas the corresponding patches 200 and 204 in FIG. 2 are separated by 2 steps. The tighter spacing of exposure sequence steps in the comers of the array afforded by the arrangement in FIG. 2, can be advantageous in cases where more widely separated exposure ratios or developed densities form a portion of the exposure sequence in which case a lesser number of steps between adjacent patches would be desired.

Figure 4:
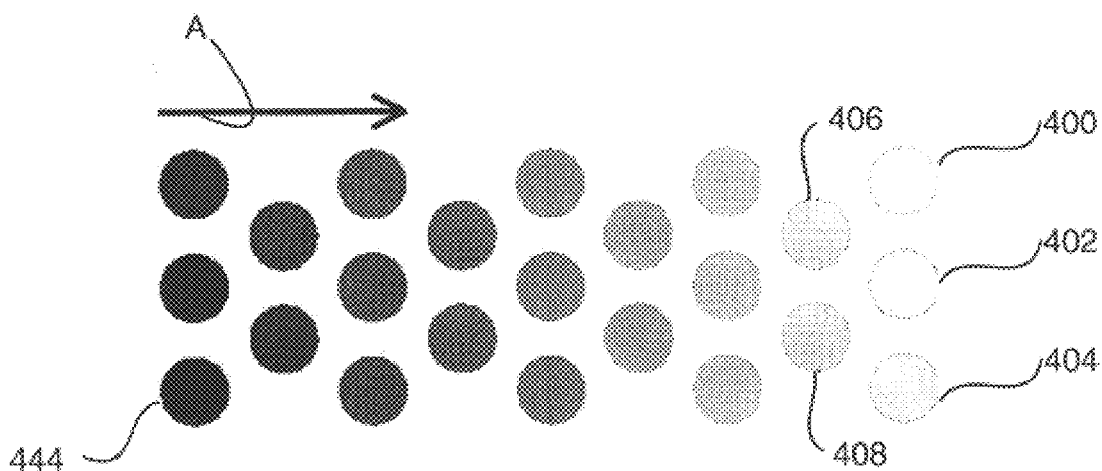
FIG. 4 is a schematic diagram of a further alternative arrangement of reference calibration patches according to the present invention.

Referring to FIG. 4, an alternative arrangement of patches is illustrated which comprises the same number of patches as shown in FIG. 2 and FIG. 3 but arranged in a rectangular array with nine columns of patches. The exposures of the patches increase along vertical columns starting with a lowest exposure patch 400, followed by increasing exposures in patches 402 and 404 in the same vertical column, followed by the next exposures in patches 406 and 408 in the next vertical column, and proceeding in likewise fashion up to the highest exposure patch 444.

All of the arrangements shown in FIGS. 2, 3 and 4 share the features that the patches form a two dimensional array such that nearest neighbors in the predominant direction are not nearest neighbors in the exposure sequence, whereby the effects of a linear defect are reduced; and the maximum number of steps in the exposure sequence between a reference calibration patch and that of its nearest neighbors in any direction is less than a predetermined number, whereby the effects of flare are reduced. In the examples shown in FIGS. 2 and 3, the maximum number of steps in the exposure sequence is five. In FIG. 4 the maximum number of steps in the exposure sequence is three.

In summary, sensitivity to stray light in exposure and measurement is reduced by placing similar patches closer and dissimilar spots more distant from each other. Sensitivity to extended linear defects is reduced by minimizing the number of measured spots that would be intersected by such a defect and by arranging exposures in each row so that the affected exposures are more widely separated. Constraints on the overall dimensions of an arrangement as well as tradeoffs between robustness to stray light and robustness to extended linear defects can lead to different arrangements that are consistent with these design principles.

The invention has been described in detail with particular reference to certain preferred embodiments thereof, but it will be understood that variations and modifications can be effected within the spirit and scope of the invention. For example, an arrangement where the highest exposure patch is located at the middle of the array, with the lower exposure patches being arranged around it, subject to the constraints noted above is possible. Furthermore, a randomized array subject to the constraints noted above is also anticipated by the present invention.

| PARTS LIST | |
|---|---|
| 10 | photographic element |
| 12 | perforation |
| 14 | reference calibration patch array |
| 200 | exposure patch |

-continued

| PARTS LIST | |
|---|---|
| 202 | exposure patch |
| 204 | exposure patch |
| 206 | exposure patch |
| 208 | exposure patch |
| 210 | linear defect |
| 212 | linear defect |
| 244 | exposure patch |
| 300 | exposure patch |
| 301 | exposure patch |
| 302 | exposure patch |
| 304 | exposure patch |
| 306 | exposure patch |
| 308 | exposure patch |
| 310 | linear defect |
| 312 | linear defect |
| 344 | exposure patch |
| 400 | exposure patch |
| 402 | exposure patch |
| 404 | exposure patch |
| 406 | exposure patch |
| 408 | exposure patch |
| 444 | exposure patch |
| 510 | photographic element |
| 512 | reference calibration patch |
| 514 | reference calibration patch |
| 516 | area |
| 518 | area |

What is claimed is:

1. A photographic element, the photographic element exhibiting linear defects in a predominant direction, comprising:
   a) a base;
   b) a photosensitive layer on the base; and
   c) a latent image of a plurality of reference calibration patches produced by a sequence of exposures on the photosensitive layer, the reference calibration patches being arranged in a two dimensional array wherein nearest neighbors in the predominant direction are not nearest neighbors in the exposure sequence and the maximum number of steps in the exposure sequence between a reference calibration patch and that of its nearest neighbors in any direction is less than a predetermined number.

2. The photographic element claimed in claim 1, wherein the minimum number of steps in the exposure sequence between a reference calibration patch and its nearest neighbors in the predominant direction is maximized.

3. The photographic element claimed in claim 1, wherein the maximum number of steps in the exposure sequence between a reference calibration patch and its nearest neighbors is minimized.

4. The photographic element claimed in claim 1, wherein the predetermined number varies with step number.

5. The photographic element claimed in claim 1, wherein the reference calibration patches are circular and the array is a close packed hexagonal array.

6. The photographic element claimed in claim 1, wherein the photographic element is a film strip and the predominant direction is the length of the film strip.

7. The photographic element claimed in claim 1, wherein the photographic element is a photographic paper web and the predominant direction is the length of the web.

8. The photographic element claimed in claim 1, wherein the photosensitive layer contains conventional silver halide chemistry.

9. The photographic element claimed in claim 1, wherein the photosensitive layer contains thermal developable chemistry.

10. The photographic element claimed in claim 1, wherein the photosensitive layer contains pressure developable chemistry.

11. A method of arranging a plurality of reference calibration patches produced by a sequence of exposures on a photographic element, the photographic element exhibiting linear defects in a predominant direction, comprising the steps of:

a) arranging the reference calibration patches in a two dimensional array;

b) assigning exposures to the reference calibration patches such that nearest neighbors in the predominant direction are not nearest neighbors in the exposure sequence, whereby the effects of a linear defect are reduced; and c) simultaneously assigning exposures to the reference calibration patches in the array such that the maximum number of steps in the exposure sequence between a reference calibration patch and that of its nearest neighbors in any direction is less than a predetermined number, whereby the effects of flare are reduced.

12. The method claimed in claim 11, wherein the reference calibration patches are circular and the array is a close packed hexagonal array.

13. The method claimed in claim 11, wherein the separation of nearest neighbors in the predominant direction is maximized.

14. The method claimed in claim 11, wherein the maximum number of steps in the exposure sequence between a reference calibration patch and that of its nearest neighbors in any direction is minimized.

15. The method claimed in claim 11, wherein the predetermined number varies with step.

16. The method claimed in claim 11, wherein the photographic element is a film strip and the predominant direction is the length of the film strip.

17. The method claimed in claim 11, wherein the photographic element is a photographic paper web and the predominant direction is the length of the web.

* * * * *